United States Patent
Dryfe et al.

(10) Patent No.: US 10,961,127 B2
(45) Date of Patent: Mar. 30, 2021

(54) 1T-PHASE TRANSITION METAL DICHALCOGENIDE NANOSHEETS

(71) Applicant: The University of Manchester, Manchester (GB)

(72) Inventors: Robert Dryfe, Manchester (GB); Andinet Ejigu, Manchester (GB); Ian Kinloch, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 16/478,990

(22) PCT Filed: Jan. 23, 2018

(86) PCT No.: PCT/EP2018/051566
§ 371 (c)(1),
(2) Date: Jul. 18, 2019

(87) PCT Pub. No.: WO2018/134435
PCT Pub. Date: Jul. 26, 2018

(65) Prior Publication Data
US 2019/0352190 A1    Nov. 21, 2019

(30) Foreign Application Priority Data

Jan. 23, 2017 (GB) .................................. 1701109

(51) Int. Cl.
| | | |
|---|---|---|
| C01G 39/00 | (2006.01) | |
| H01B 1/04 | (2006.01) | |
| C01G 39/06 | (2006.01) | |
| C25B 1/00 | (2021.01) | |
| H01G 11/36 | (2013.01) | |
| H01G 11/86 | (2013.01) | |

(52) U.S. Cl.
CPC .............. *C01G 39/06* (2013.01); *C25B 1/00* (2013.01); *H01B 1/04* (2013.01); *H01G 11/36* (2013.01);
(Continued)

(58) Field of Classification Search
CPC . H01B 1/00; H01B 1/04; C01G 39/06; H01G 11/36; H01G 11/86
See application file for complete search history.

(56) References Cited

U.S. PATENT DOCUMENTS

| | | | |
|---|---|---|---|
| 2003/0224168 A1 | 12/2003 | Mack et al. | |
| 2016/0308006 A1* | 10/2016 | Park | ................ H01L 21/02381 |
| 2019/0169041 A1* | 6/2019 | Daniels | ................ C01B 19/007 |

FOREIGN PATENT DOCUMENTS

| | | |
|---|---|---|
| CN | 101024516 A | 8/2007 |
| CN | 103880084 A | 6/2014 |

(Continued)

OTHER PUBLICATIONS

Bissett et al "Characterization of MoS2-graphene composites for high performance coin cell supercapacitors", Applied Materials & Interfaces, 2015, 7, 17388-17398.*

(Continued)

*Primary Examiner* — Mark Kopec
(74) *Attorney, Agent, or Firm* — Nixon Peabody LLP; Linda B. Huber

(57) ABSTRACT

A method for the production of 1T-transition metal dichalcogenide few-layer nanosheets and/or monolayer nanosheets comprising electrochemical intercalation of lithium ions into a negative electrode comprising a bulk 2H-transition metal dichalcogenide to provide an intercalated electrode, and an exfoliation step comprising contacting the intercalated electrode with a protic solvent to produce 1T-transition metal dichalcogenide few-layer nanosheets and/or monolayer nanosheets. An electrochemical capacitor comprising a composite electrode comprising 1T-MoS$_2$ nanosheets and graphene, and a method of producing a composite electrode for use in an electrochemical capacitor.

12 Claims, 6 Drawing Sheets

(52) U.S. Cl.
CPC .......... *H01G 11/86* (2013.01); *C01P 2002/82* (2013.01); *C01P 2002/84* (2013.01); *C01P 2002/85* (2013.01); *C01P 2004/24* (2013.01); *C01P 2006/40* (2013.01)

(56) References Cited

FOREIGN PATENT DOCUMENTS

| CN | 104671286 A | 6/2015 |
|---|---|---|
| CN | 106257609 A | 12/2016 |
| EP | 0245670 A2 | 11/1987 |
| WO | 2015021056 A2 | 2/2015 |
| WO | 2018134435 A1 | 7/2018 |

OTHER PUBLICATIONS

Zhou et al "Facile synthesis and electrochemical properties of two dimensional layered MoS2/graphene composite for reversible lithium storage", Journal of Power Sources, 251 (2014) 264-268.*

Zhou et al "Rational design and synthesis of 3D MoS2 heirarchitecture with tunable nanosheets and sH/1T phase within graphene for superior lithium storage", Electrochemica Acta 211 (2016) 1048-1055.*

International Search Report and Written Opinion of PCT/EP2018/051566, dated May 30, 2018, 11 Pages.

Acerce et al., Metallic 1T Phase MoS2 Nanosheets as Supercapacitor Electrode Materials, 2015, Nature Nanotechnology, DOI: 10.1038/NNANO.2015.40, 6 Pages.

Benavente et al., Intercalation Chemistry of Molybdenum Disulfide, 2002, Coordination Chemistry Reviews, vol. 224, pp. 87-109.

Firmiano et al., Supercapacitor Electrodes Obtained by Directly Bonding 2D MoS2 on Reduced Graphene Oxide, 2013, Advanced Energy Materials, 2014, vol. 4(6), 8 Pages.

Zeng et al., An Effective Method for the Fabrication of Few-Layer-Thick Inorganic Nanosheets, 2012, Angew. Chem. Int. Ed., vol. 51, pp. 9052-9056.

Zeng et al., Single-Layer Semiconducting Nanosheets: High-Yield Preparation and Device Fabrication, 2011, Angew. Chem. Int. Ed., vol. 50, pp. 11093-11097.

* cited by examiner

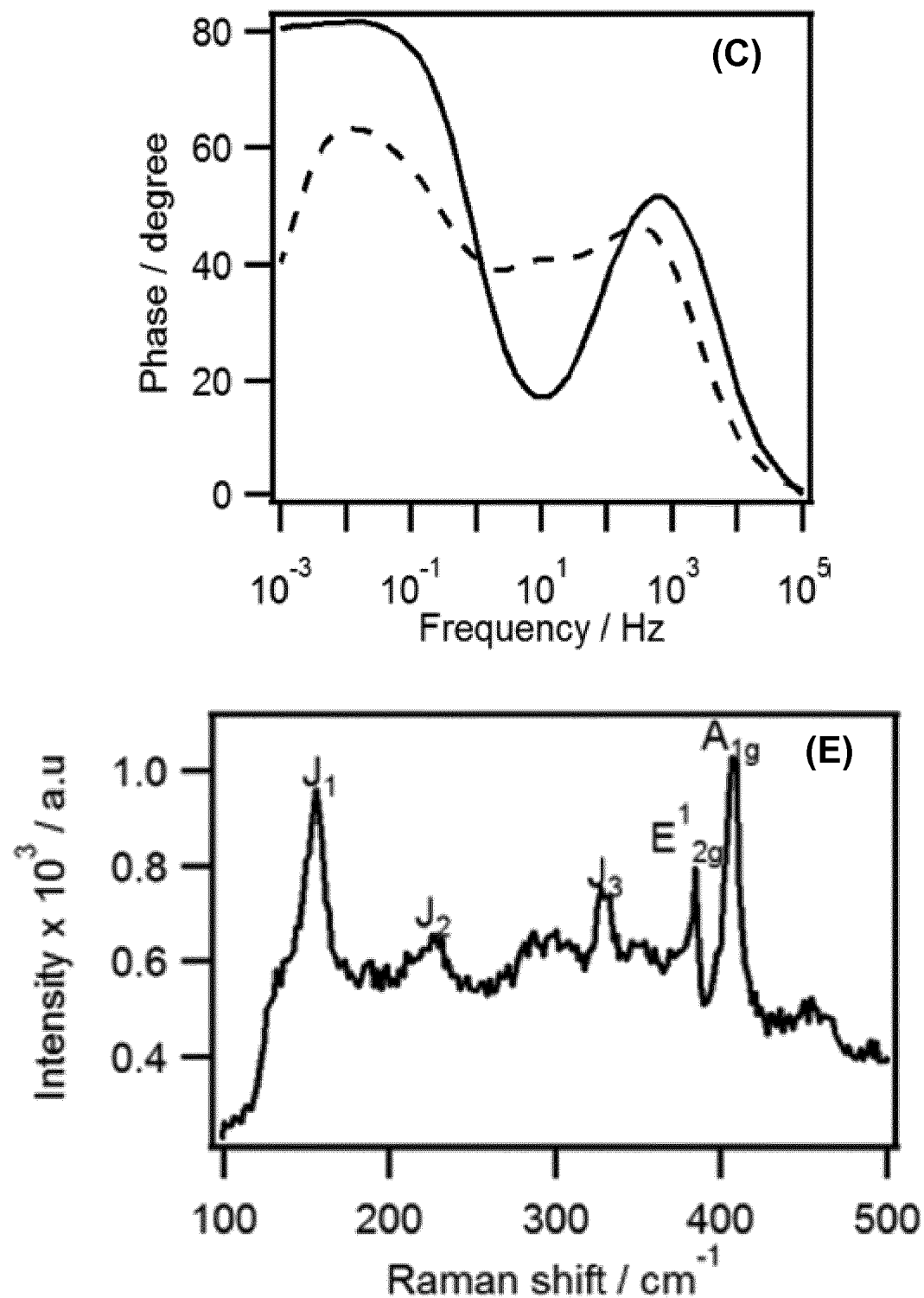
FIGURE 4 (cont) - INSERTS

1T-PHASE TRANSITION METAL DICHALCOGENIDE NANOSHEETS

CROSS-REFERENCE TO RELATED APPLICATIONS

This application is a National Phase of International Application No. PCT/EP2018/051566 filed Jan. 23, 2018, which designated the U.S. and that International Application was published under PCT Article 21(2) in English. This application also includes a claim of priority under 35 U.S.C. § 119(a) and § 365(b) to British patent application No. GB 1701109.9 filed Jan. 23, 2017, the entirety of which is hereby incorporated by reference.

FIELD OF THE INVENTION

The invention relates to a method for the production of 1T-phase transition metal dichalcogenide few- and/or monolayer nanosheets. The invention further relates to electrochemical capacitors comprising 1T-$MoS_2$ and graphene composite electrodes.

BACKGROUND

Since the discovery of graphene, there has been a growing interest in other materials that can be produced as two-dimensional species. These atomically thin products typically exhibit interesting optical, electrical and mechanical properties.

One such class of materials is the so-called 2D transition metal dichalcogenides, of which molybdenum disulfide is perhaps the most famous and interesting example. $MoS_2$ is stable as atomically thin sheets, and a single sheet of $MoS_2$ consists of a plane of Mo atoms sandwiched between two layers of sulfur atoms in the form of S—Mo—S. The bond holding together the metal and sulfur atom is a strong covalent bond whilst each layer of $MoS_2$ is held together loosely by van der Waals interactions. Other, analogous 2D transition metal dichalcogenides include tungsten disulfide and molybdenum diselenide and tungsten diselenide.

These transition metal dichalcogenides exhibit two possible crystal states, a naturally occurring trigonal prismatic phase (typically denoted by a 2H prefix as, for example, 2H-$MoS_2$), and a non-naturally occurring tetrahedral phase (typically denoted by a 1T prefix as, for example, 1T-$MoS_2$). Molybdenum disulfide in this latter form (i.e. 1T-$MoS_2$) can be prepared by intercalation chemistry.

In the case of molybdenum disulphide, the 2H phase is semiconducting with a direct bandgap of ~1.9 eV for monolayer sheets. The 1T phase on the other hand is metallic, with a conductivity up to $10^7$ times higher than the 2H phase.

Consequently, metallic phase $MoS_2$ nanosheets (and indeed those of other 2D transition metal dichalcogenides) are very attractive for a number of electrochemical applications including as a supercapacitor electrodes and as a catalyst for hydrogen evolution and dye-sensitised solar cells. For example, Acerce et al. recently demonstrated that the gravimetric capacitance of chemically exfoliated 1T-$MoS_2$ was 20 times higher than the gravimetric capacitance of the 2H-$MoS_2$, while the basal plane of 1T-$MoS_2$ has been found to be the main active site for HER (hydrogen evolution reactions) resulting in a significant enhancement in the overall catalytic activity. By contrast, the basal plane of 2H-$MoS_2$ is catalytically inert towards HER.

To date, only a few synthetic methods have been reported to produce 1T-$MoS_2$. These are top-down (chemical exfoliation) and bottom-up (hydrothermal synthesis) approaches.

The most common method for producing 1T-$MoS_2$ nanosheets involves chemical organolithium intercalation between the layers of bulk $MoS_2$. This process starts first by reacting butyllithium with $MoS_2$ to produce $Li_xMoS_2$. Then, the resulting Li intercalated bulk $MoS_2$ is immersed in water and sonicated to exfoliate it, producing monolayer and/or few layer $MoS_2$ nanosheets. The structural change from the 2H to 1T phase on lithium intercalation is attributed to the electron donation from lithium into the conduction band of $MoS_2$.

While this method is attractive in terms of its high yield and production of monolayer $MoS_2$ sheets, it also has some major drawbacks. The experimental process requires a long lithiation time (2-3 days) under reflux (100° C.). Furthermore, organolithium compounds are highly sensitive to air and moisture; their pyrophoric nature means that the reaction must be performed under glove box conditions.

Another approach is "bottom-up", using a hydrothermal process. According to reports, this method can produce stable 1T-$MoS_2$ in large quantities with a high concentration of the 1T metallic phase. The product however is thicker $MoS_2$ nanoplatelets and smaller flakes (~100 nm lateral size). These may be less useful for electronic applications.

Recently, Zhang et al. reported an electrochemical lithiation method for the synthesis of 1T-$MoS_2$. They prepared $MoS_2$ electrode by mixing $MoS_2$ powder with carbon black (10%) as conducting additive and polyvinylidene fluoride (PVDF) as a binder (10%), and then inserted it into a battery cell within an Ar-filled glove box using metallic lithium as a counter electrode. The experimental time scale was shorted from days (in chemical intercalation) to hours, but proved difficult to scale up, and separating the conductive additive contaminant is challenging. Potential unwanted side reactions were also observed and the conductive additive contaminates the product.

This method also proved to be advantageous in terms of controlling the degree of lithium insertion. Nonetheless, the use of metallic lithium means that the intercalation process must be carried out in a controlled inert atmosphere. The battery-type electrochemical cell setup also presents challenges in terms of scale up.

Rivolo et al. have also described work to generate mixed 1H-, 1T-$MoS_2$, reduced graphene oxide aerogels for use as electrodes. The 1T phase is apparently obtained by an in situ co-synthesis of an $MoS_2$ nanostructure together with the rGO interconnected 3D matrix. There remains a need in the art for efficient and scalable processes for the production of 1T-transition metal dichalcogenide (TMDC) nanosheets from their naturally occurring bulk 2H-allotropes.

SUMMARY OF THE INVENTION

The invention seeks to address this need by a two-step synthesis method comprising an electrochemical intercalation step followed by an exfoliation step. Using this method, high concentration few-layer 1T-$MoS_2$ and other 1T-TMDCs can be produced from the corresponding bulk 2H-TMDCs in short (a few hours, or even less) timescales using air-stable reagents.

Accordingly, in a first aspect the invention may provide a method of producing 1T-transition metal dichalcogenide few-layer nanosheets and/or monolayer nanosheets, the method comprising:

(i) an electrochemical intercalation step in an electrochemical cell, the cell comprising a negative electrode comprising a bulk 2H-transition metal dichalcogenide, a counter electrode, and an electrolyte comprising a lithium salt in a solvent, wherein said solvent is capable of forming a solid electrolyte interface layer;
wherein the electrochemical intercalation step comprises applying a potential difference to the cell so as to intercalate lithium ions into the negative electrode to provide an intercalated electrode; then
(ii) an exfoliation step comprising contacting the intercalated electrode with a protic solvent to produce 1T-transition metal dichalcogenide few-layer nanosheets and/or monolayer nanosheets.

Suitably, the electrolyte solvent is a solvent which forms a solid electrolyte interface (SEI), thereby reducing or preventing solvent co-intercalation. Without wishing to be bound by any particular theory, the inventors think that the formation of an SEI, which is permeable to lithium cations, enables a sufficient degree of lithium intercalation to effect the desired phase change while preventing solvent intercalation and/or exfoliation.

Suitably, the electrolyte solvent does not decompose to produce a gas. Alkyl carbonates and mixtures of alkyl carbonates can be used. Suitable solvents include propylene carbonate (PC), ethylene carbonate (EC) and dimethyl carbonate (DMC) and mixtures thereof. A preferred solvent is a mixture of dimethyl/ethylene carbonate (DMC/EC), preferably in about 1:1 v/v.

The lithium salt must be at least partially soluble in the electrolyte solvent. Suitable lithium salts include, but are not limited to, $LiClO_4$ and $LiPF_6$. For reasons of cost, the invention is exemplified herein using lithium perchlorate.

Advantageously, the counter electrode may be inert. This contrasts with the use of a lithium anode in the Zhang method. (It will be appreciated that, suitably, the counter electrode of the present invention is not lithium metal). As a consequence, the electrochemical cells used in the present invention can be set up on a bench top, without the need for a glove box, making commercial scale up and production feasible.

Suitable materials for use as a counter electrode are known in the art, and often include precious metals, mercury and carbon. The term precious metal is understood in the art and is used to refer to gold, silver, palladium and platinum. A carbon electrode may be graphitic. In some cases, the counter electrode is platinum, for example a platinum mesh.

Preferably, the potential difference of the cell is measure with reference a further electrode, termed a reference electrode, as is conventional in the art. Accordingly, in some cases the cell includes a reference electrode, which may be a silver electrode, for example a silver wire.

The method achieves both a phase change and exfoliation. The phase change is from the 2H to 1T geometry. Transition metal dichalcogenides which occur naturally in the 2H phase include molybdenum disulphide, tungsten disulphide, molybdenum diselenide and tungsten diselenide. The bulk 2H-TDMC may be $MoS_2$, $WS_2$, $MoSe_2$ or $WSe_2$, leading to $1T-MoS_2$, $1T-WS_2$, $1T-MoSe_2$ and $1T-WSe_2$ nanosheets, respectively.

Owing to the toxicity of selenium, $MoS_2$ and $WS_2$ are preferred.

In some cases, the invention primarily produces few-layer nanosheets which are at least 2 or 3 layers thick. For example, in some cases at least 50% by weight of the 'few-layer nanosheets and/or monosheets' produced is 3-10 layer nanosheets, for example 3-5 layer nanosheets. In some cases at least 75% by weight of the 'few-layer nanosheets and/or monosheets' produced is 3-10 layer nanosheets, for example 3-5 layer nanosheets.

In some cases, the transition metal dichalcogenide is $MoS_2$. The inventors have observed that trilayer (3 layer) nanosheets are favoured for $MoS_2$. In some cases, the transition metal dichalcogenide is $MoS_2$ and at least 50% by weight, for example at least 75% by weight, of the 1T-transition metal dichalcogenide 'few-layer nanosheets and/or monosheets' is trilayer nanosheets. They have also observed that trilayer nanosheets are favoured for $WS_2$.

The potential difference may be applied to the electrochemical cell for between 1 and 5 hours, preferably between 1 and 3 hours. In some cases, it is applied for about 2 hours. Advantageously, the process may be completed in about 1 hour.

In some cases, the negative electrode is a pellet of compressed 2H-transition metal dichalcogenide powder. The inventors have observed that use of these pellets leads to good yields, which may be attributed to the large surface area exposed for intercalation.

In some cases, the negative electrode comprises a 2H-transition metal dichalcogenide crystal. The inventors have found that the use of crystals leads to nanosheets having a large lateral size, which may be useful for some applications.

The material is contacted with a protic solvent to effect exfoliation. Preferably, the protic solvent is water. The resultant suspension may be sonicated. The method may further comprise a step of collecting the exfoliated material, for example by filtration of the suspension.

The first aspect of the invention provides exfoliated, phase-changed, material via a two-step process (intercalation then exfoliation).

In a second embodiment, the invention may provide a method for producing a lithium-intercalated bulk transition metal dichalcogenide, the method comprising an electrochemical intercalation step in an electrochemical cell, the cell comprising a negative electrode comprising a bulk 2H-transition metal dichalcogenide, a counter electrode, and an electrolyte comprising a lithium salt in a solvent, wherein said solvent is capable of forming a solid electrolyte interface layer; wherein the electrochemical intercalation step applying a potential difference to the cell so as to intercalate lithium ions into the negative electrode to provide the lithium-intercalated bulk transition metal dichalcogenide.

It will be appreciated that the options and preferences described for the first aspect apply to the second aspect.

The inventors have found that $1T-MoS_2$ (in this case characterised as about 60% 1T-phase concentration, and predominantly trilayer) can be combined with solution exfoliated graphene to produce supercapacitors having very desirable properties.

Accordingly, in a third aspect, the invention may provide an electrochemical capacitor comprising a composite electrode, the composite electrode comprising $1T-MoS_2$ nanosheets and graphene, wherein the $1T-MoS_2$ nanosheets is at least 50% by weight trilayer nanosheets.

It will be appreciated that the electrochemical capacitor may be termed a supercapacitor.

In some cases, the composite electrode comprises graphene and $MoS_2$ nanosheets in a 1:1 weight ratio.

In some cases, the $MoS_2$ nanosheets of the composite electrode are at least 50% 1T phase. In other words, the 1T phase concentration of the $MoS_2$ nanosheets is at least 50%.

Suitably, the composite electrode is substantially free of $MoO_3$.

In a fourth aspect, the invention may provide a method of producing a composite electrode for use in an electrochemical capacitor, the method comprising combining 1T-MoS$_2$ nanosheets prepared by the method of the first aspect with graphene.

The 1T-MoS$_2$ nanosheets and graphene may be combined to provide a dispersion. This may be filtered through a support, depositing the nanosheets to provide a membrane/film. The membrane/film is a composite electrode which may be layered in, for example, a coin cell. Other methods of forming composite electrodes are known in the art. For example, dispersions may be spin-coated or drop-cast.

Accordingly, in some cases, the method further comprises combining 1T-MoS$_2$ nanosheets and graphene to provide a dispersion. The 1T-MoS$_2$ and graphene may themselves be provided as dispersions, which may be mixed in a 1:1 concentration ratio. Dispersions may be provided in water, alcohol and mixtures thereof, preferably mixtures of water and isopropanol.

DETAILED DESCRIPTION OF THE INVENTION

Definitions

Mono- and Few-Layer Sheets

The invention produces mono- and/or few-layer sheets of material. In the context of the present invention, few-layer refers to 10 layers or fewer, for example, 9, 8, 7, 6, 5, 4, or 3 layers or fewer. This material is also referred to herein for brevity as nanosheets, although it will be appreciated that the number of layers (10 layers or fewer), rather than any particular absolute thickness, is intended. The term monolayer refers to material that is one layer thick.

Preferably, especially in the case of MoS$_2$, the invention produces three layer sheets (so-called trilayers).

Bulk Materials

As used herein, the bulk is used to assist distinction between the 2D nanosheets of the invention, which are thin (10 layers or fewer) and their 3D (many layer) counterparts. For example, graphite is bulk material, while graphene is the corresponding 2D material. Bulk materials may be exfoliated to provide 2D nanosheets.

1T-TMDC

As explained herein, the term 1T-TDMC does not necessarily refer to material which is exclusively in the 1T crystal state. Indeed, to date no method has successfully produced exclusively 1T-MoS$_2$. The skilled person will understand therefore that the prefix 1T denotes that the material has at least some 1T character.

As used herein, 1T-TDMC is used to denote a material having a least 10% by concentration 1T phase, for example, at least 20%, at least 30%, at least 40%, at least 50%. In the case of 1T-MoS$_2$, the amount may be about 60%. Methods of determining the concentration of 1T phase are described herein. The presence of the 1T phase can also be determined observationally owing to an in-suspension colour difference for MoS$_2$. Few-layer 2H-MoS$_2$ suspended in water is yellow. The presence of 1T phase leads to a grey appearance, which can be determined visually. As described herein, 1T-MoS$_2$ (~60% 1T) produced according to the method of the invention produced to a very dark grey suspension.

TDMC Electrode

The electrode comprises 2H-TDMC, which may be present, for example, as a powder which is compressed to form a pellet, or held together by a binder (for example, a polymer) or an electrode cohesion element such a mesh material. The electrode may also comprise crystalline 2H-TDMC, for example it may be large crystal. The use of crystals may result in laterally larger sheets.

It will be appreciated that the 2H-TDMC material of the electrode is a bulk (3D) material.

Suitably, the electrode does not comprise any conductive additive or other material. The electrode may be connected to the electrical circuit by a metal wire, which is preferably not inserted into the electrolyte.

Preferably the electrode is a pellet of compressed 2H-TDMC powder or is a crystal of 2H-TDMC. In some cases, the electrode is a pellet of compressed 2H-TDMC powder of less than 2.0 mm thickness, for example 1.0-1.5 mm thickness.

2H-Transiton Metal Dichalcoqenides

The electrode comprises a 2H-TDMC, which is a bulk (3D) material. During the method the TDMC undergoes a phase change and exfoliation to produce 2D TMDC having 1T phase (1T-TDMC). This 1T character is often referred to as "metallic" or "metallic phase". Suitably, the 2H-TDMC is MoS$_2$, WS$_2$, MoSe$_2$ or WSe$_2$, preferably MoS$_2$ or WS$_2$, most MoS$_2$.

Intercalation Step

The electrochemical intercalation step is suitably carried out at room temperature, although in some cases the electrolyte may be heated or cooled.

The skilled person will recognise that a range of suitable potential difference values may be applied, and these may be quantified with reference to a third (reference electrode). Accordingly, preferably the cell further comprises a reference electrode, which may be silver.

In some cases, the potential difference is kept substantially constant during the intercalation step. However, it will be appreciated that the resistance of the cell may change as intercalation occurs and/or the SEI layer forms on the electrode. According the current and/or voltage measured may change over the duration of the intercalation step.

In some cases, the applied potential difference is between −3.0 V and −5.0 V vs. Ag wire, preferably between −4.0 V and −5.0 V, most preferably about −4.5 V.

The duration of the intercalation step is suitably hours. Accordingly, in some embodiments it is less than 12 h, preferably less than 6 h, preferably less than 5 h, preferably less than 4 h, for example 3 h or less.

The duration of the intercalation step is suitably at least 30 minutes, for example at least 45 minutes, for example at least 60 minutes.

In some cases, the duration of the intercalation step is between 1 and 6 hours, for example, between 1 and 3 hours, for example between 1 and 2.5 hours, for example between one and 2 hours. In some cases, the duration is about 2 hours.

The following describes an optimised cell for MoS$_2$. Cyclic voltammetry was used to determine the potential at which Li$^+$ intercalation occurs into a MoS$_2$ pellet and a cyclic voltammogram (CV) was recorded at the MoS$_2$ electrode in 1.0 M LiClO$_4$ in DMC/EC mixture. As the electrode potential was scanned from 0.5 V in a negative direction, a cathodic current started to flow around −3.0 V which increased gradually until −4.0 V. This process was due to the insertion of Li$^+$ into the MoS$_2$. In the return sweep, a broad anodic peak was seen due to the de-intercalation of Li$^+$. Based on the CV result, −4.5 V was chosen for electrochemical insertion of Li$^+$ into MoS$_2$. In the scale of the reference electrode used, an applied potential between −4.0 and −5.0 V vs. Ag wire did not result in any notable decomposition reactions. Electrolysis was carried out at various time periods of 1 h, 2 h, 4 h and 6 h and the optimum electrolysis time was found to be 2 h. The optimum intercalation/exfoliation result was obtained when thinner (~1.0-1.5 mm thickness) MoS$_2$ pellets were used.

Solid Electrolyte Interface

Also referred to in the literature as a solid-electrolyte interphase, this is a well-studied phenomenon in the field of lithium ion batteries. An SEI forms when appropriate organic solvents decompose on the negative electrode during the electrochemical reaction and form a solid layer called the solid electrolyte interphase which is electrically insulating yet provides significant ionic conductivity. In the present case, the inventors speculate that the formation of the SEI is important as it prevents exfoliation of the electrode, thereby permitting sufficient intercalation of the lithium ions to effect the 2H to 1T phase change.

Exfoliation Step

The Li$^+$ intercalated TMDC (Li$_x$[TDMC]) electrode is contacted with a protic solvent.

It may be rinsed before exfoliation. For example, in some cases the intercalated electrode is rinsed with an aprotic solvent, suitably a polar aprotic solvent such as acetone.

Suitable protic solvents include water, alcohols and mixtures thereof. A preferred protic solvent is water, which is suitably deoxygenated and deionised. During this process, a significant amount of gas is evolved due to the reaction between the solvent and lithium which forms, for example lithium hydroxide and hydrogen gas between the layers of the TMDC, breaking the structure apart.

To assist nanosheet disassociation, the protic solvent may be sonicated, either during the contact or after the initial expansion. Sonication may be for about 30 minutes.

SUMMARY OF THE FIGURES

The invention will now be described with reference to the following figures, in which.

EXAMPLES

Production of 1T-MoS$_2$ Nanosheets

Figure 1:
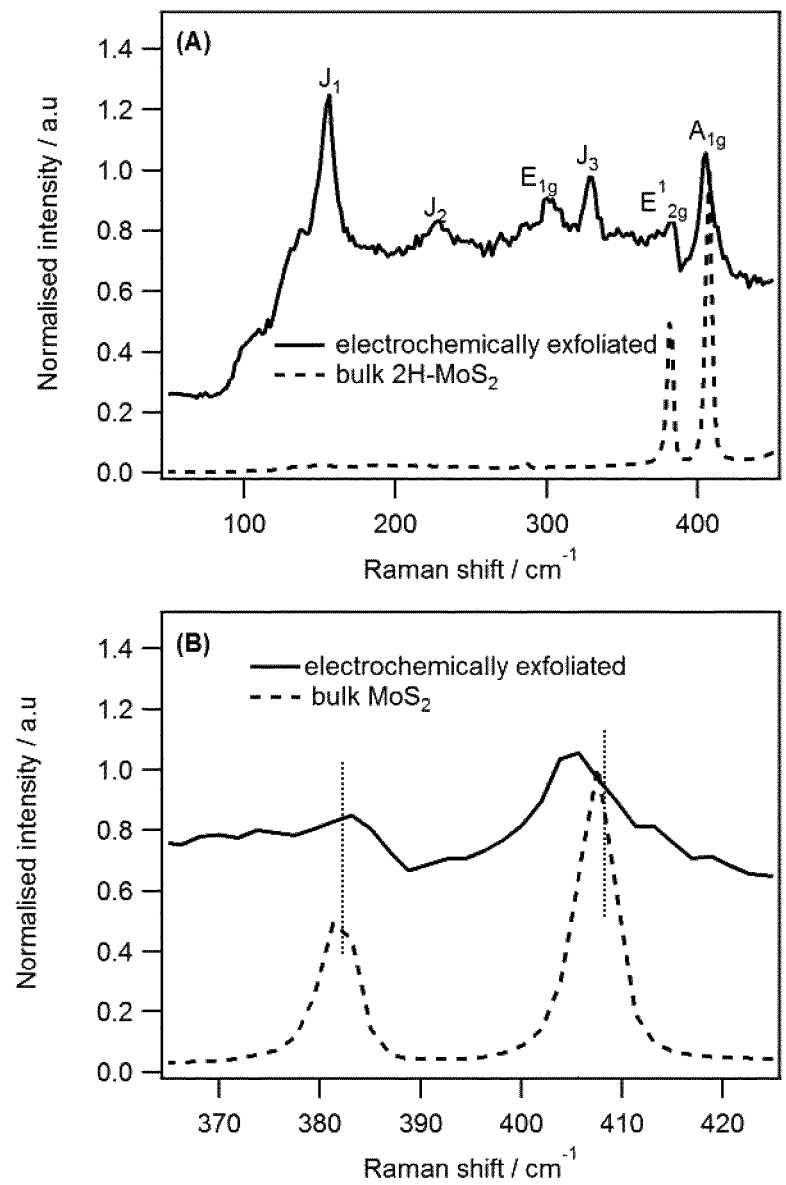
FIG. 1 shows (A) and (B) Raman spectra of electrochemically exfoliated MoS$_2$ by intercalation of Li$^+$. The electrochemical intercalation was performed at −4.5 V vs Ag wire from a solution containing 1.0 M LiClO$_4$ in DMC/EC. The sample for Raman analysis was prepared by drop coating the dispersion of MoS$_2$ on to Si/SiO$_2$ wafer which was then dried in air at room temperature.

An electrochemical cell having a MoS$_2$ pellet (Sigma, 99% with an average particle size of 6 μm) or a MoS$_2$ natural crystal working electrode, a Pt mesh counter electrode and an Ag wire reference electrode was used. The electrolyte was 1 M LiClO$_4$ in a mixture of dimethyl carbonate (DMC) and ethylene carbonate (EC) in one to one volume ratio. The potential of an Ag wire was stable within a few mV for over 4 h. The MoS$_2$ pellet (12 mm diameter) was made by hydraulic press of the powder (0.4-1.0 g) at 2.5 tons. Prior to performing electrolysis, N$_2$ gas was bubbled into the electrolyte for 30 min and during the electrochemical measurements an atmosphere of N$_2$ was maintained above the electrolyte.

Electrochemical intercalation of Li$^+$ was performed using chronoamperometry by applying a potential of −4.5 V vs Ag wire for 2 hr. The intercalated pellet was then rinsed with acetone and inserted immediately into deionised deoxygenated water for exfoliation and sonicated for 30 mins. The resulting black suspension was added to a separatory funnel and washed with n-hexane (50 mL) twice to extract any residual of organic impurities including the solid electrolyte interface. The concentrated black aqueous phase was collected and filtered over a PTFE membrane (0.2 μm pore size) and washed with 1 L of deionised water to remove excess lithium in the form of LiOH. The resulting washed powder was re-dispersed in deionised water and sonicated for 20 min, and then centrifuged at 1500 rpm for 30 min to remove any non-exfoliated material as sediment yielding a highly stable dispersion.

Characterisation of the 1T-MoS$_2$ Nanosheet Product

Raman spectroscopy provides rapid identification of the phase of MoS$_2$ and the thickness of the MoS$_2$ flake. The 2H and 1T phase can easily be distinguished since each phase has different symmetry structures. FIG. 1 shows the comparison between the Raman spectra of the raw MoS$_2$ powder and after exfoliation by electrochemical intercalation of Li$^+$. The Raman spectra were collected from various random spots and the average spectrum was reported. Two prominent Raman bands were observed in the bulk powder at 381.9 cm$^{-1}$ and 407.4 cm$^{-1}$ due to the in-plane vibration (E$^1_{2g}$) and the out-of-plane (A$_{1g}$) vibration respectively. After exfoliation, a series of extra Raman signatures emerged at 155 cm$^{-1}$ (J$_1$), 227 cm$^{-1}$ (J$_2$) and 330.5 cm$^{-1}$ (J$_3$) in addition to the E$^1_{2g}$ (382.2 cm$^{-1}$) and A$_{1g}$ (405.3 cm$^{-1}$) (FIG. 1a). These bands are the characteristic features for the formation of the 1T phase. The formation of the 1T-phase in significant concentrations was also more evident by the major decrease in the intensity of the E$^1_{2g}$ peak after exfoliation. Calandra suggested that $J_1$ was due to the in-plane shearing mode of one side of the $MoS_2$ chain relative to the other, $J_2$ corresponds to the shifts of the S-atom layers with respect to the Mo atoms and $J_3$ was due to the stretching of one side of the zig-zag chain relative to the other with a slightly out-of-plane component. The peak shape and position of $E^1_{2g}$ and $A_{1g}$ was also changed after exfoliation (FIG. 1B). For example, the half width at half maximum of $A_{1g}$ increased from 4.5 in bulk $MoS_2$ to 9.5 after exfoliation and the peak separation between $E^1_{2g}$ and $A_{1g}$ decreased from 26 $cm^{-1}$ in bulk $MoS_2$ to 23.1 $cm^{-1}$ in exfoliated samples. It has been reported in literature that that the Raman spectrum of mechanically exfoliated $MoS_2$ crystals exhibits a peak separation of ~20, ~22 and ~23 $cm^{-1}$ respectively for monolayer, bilayer and trilayer $MoS_2$ nanosheets respectively. Based on this calibration data, the thickness of these exfoliated samples is therefore estimated to be trilayer.

The thickness of the exfoliated samples was further characterised by AFM. Statistical analysis of 150 $MoS_2$ flakes revealed that the majority of the lateral flake sizes vary between 300 nm and 500 nm. The inventors also observed that lateral sizes over 2 μm can be obtained if the starting $MoS_2$ material is a natural $MoS_2$ crystal.

The majority (>95%) of the flake thicknesses displayed the same topographic height of 4.5 nm regardless of the source of $MoS_2$ used for exfoliation ($MoS_2$ powder or crystalline). Previous works showed that the measured flake thicknesses for solution/chemically exfoliated $MoS_2$ deposited on $Si/SiO_2$ varied between 1.1 and 1.9 nm for monolayer and ~5 nm for trilayer nanosheets. The deviations from their theoretical thickness (0.615 nm for monolayer) were attributed to the presence of adventitious adsorbates, trapped or adsorbed water molecules and flake-substrate equilibrium separation. In the case of 1T phase in particular, the excess negative charge formed due to the electron donation from lithium is stabilised by adsorption of water molecules on both sides of the nanosheets which then increases the overall thickness of the flake. Analysis of the product's Raman data in conjunction with AFM thickness measurement strongly suggests that the majority of the produced flakes are trilayer. Some few flakes showed a thickness of 1.5 nm, which are thought to be monolayer $MoS_2$ flakes.

Figure 2:
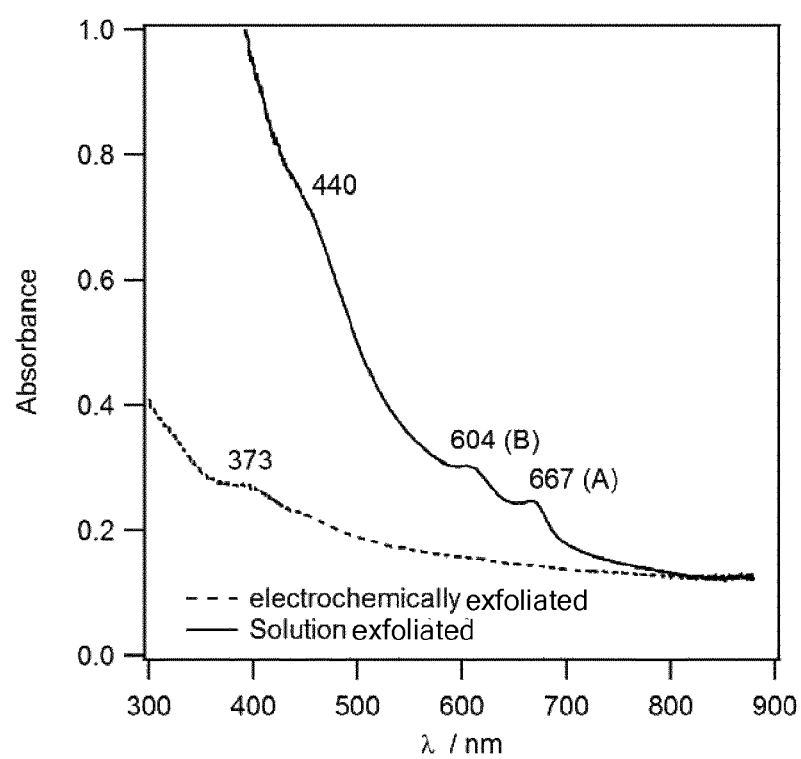
FIG. 2 shows optical absorption spectra of exfoliated MoS$_2$ dispersions in water and isopropanol mixture.

FIG. 2 shows the UV-Visible absorption spectra of $1T-MoS_2$ and $2H-MoS_2$ dispersion (diluted in isopropanol). It is known that the 2H phase is semiconducting and therefore it exhibits characteristic excitonic peaks that are related to its band gap. As shown in FIG. 2, the dispersion obtained from the 2H phase showed two notable excitons at 604 and 667 nm that are associated with the direct-gap transition due to the energy split from valence band and spin-orbit coupling. After exfoliation, the two excitonic peaks (A and B) disappeared due to the phase transition from the semiconducting to metallic $MoS_2$. The difference in optical properties was also evident when examining the colour of the respective phase dispersions: the 2H phase was dark yellow while the $1T-MoS_2$ was dark grey.

Figure 3:
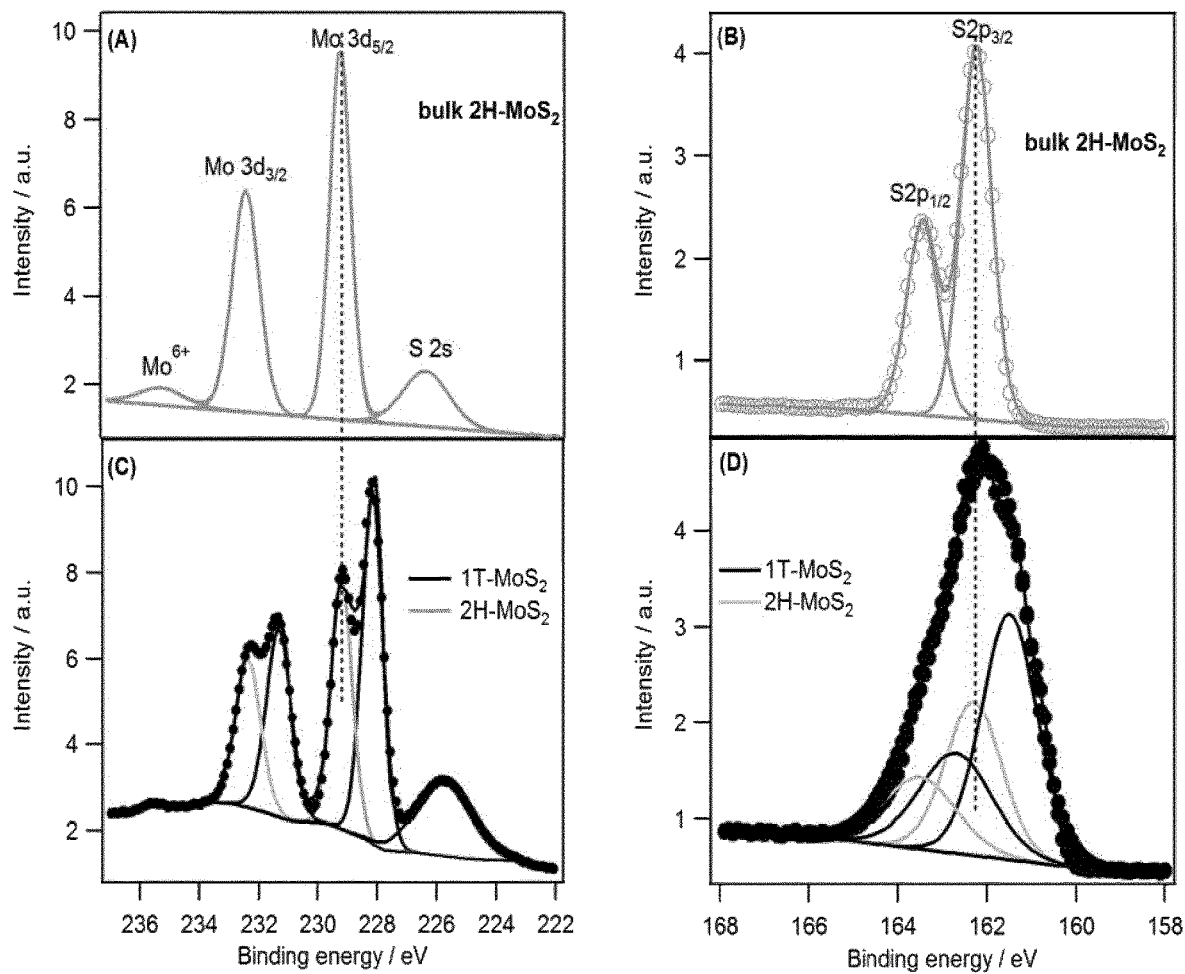
FIG. 3 shows (A) High-resolution XP spectrum of bulk MoS$_2$ in the Mo3d region, (B) High-resolution XP spectrum of bulk MoS$_2$ in the S2p region, (C) High-resolution XP spectrum of electrochemically exfoliated MoS$_2$ by intercalation of Li$^+$ in the Mo3d region and (D) High-resolution XP spectrum of electrochemically exfoliated MoS$_2$ by intercalation of Li$^+$ in the S 2p region. All peak positions were charge-corrected by setting the binding energy of the C 1s signal to 284.5 eV. The samples for XPS were prepared by filtering the dispersions onto a PVDF membrane.

The invention provides high concentration 1T phase products. As demonstrated by the prior art, complete phase transformation from $2H-MoS_2$ to $1T-MoS_2$ has never been realised using lithium intercalation and the resulting structures contain a portion of both 2H and 1T phases. XPS was used to quantify the fraction of each phase in the products of the invention by the deconvolution of the high resolution spectra of the Mo3d and S2p peaks of the bulk and exfoliated $MoS_2$ (FIG. 3). The Mo 3d spectra of bulk $2H-MoS_2$ displayed a doublet with peaks at 229.2 and 232.4 eV that correspond to $Mo^{4+}3d_{5/2}$ and $Mo^{4+}3d_{3/2}$ respectively. After exfoliation, a new pair of peaks emerged, in addition to the known doublet peak of $Mo^{4+}$ for $2H-MoS_2$, that are shifted to lower binding energies by ~0.8 eV with respect to the 2H phase. Similarly, the S2p doublet also displayed a new pair of peaks at a lower binding energy of 161.5 eV ($S2p_{3/2}$) and 162.7 eV ($S2p_{1/2}$). These new pairs of peaks were due to the formation of the 1T phase. Deconvolution of the Mo 3d and S 2p regions indicates that the concentration 1T phase in the nanosheets is 60%, which is comparable to the concentration of the 1T phase using chemical exfoliation yields (typically 60 to 70% concentration).

Production of $1T-WS_2$ Nanosheets

Tungsten disulfide was subjected to the same two-step process. Using $Li^+$ intercalation the desired 2H to 1T phase change was observed. Exfoliation was achieved through immersion of the intercalated product in water. Characterisation of the exfoliated product using UV-visible spectroscopy and X-ray photoelectron spectroscopy confirmed the formation the 1T-Phase. The concertation of the 1T phase in exfoliated $WS_2$ was 52%.

Materials and Reagents $MoS_2$ powder (99%, ~6 μm), lithium perchlorate (99.99%), anhydrous dimethyl carbonate (99%) and ethylene carbonate (99%) were purchased from Sigma-Aldrich® and used as received. $MoS_2$ natural crystals were obtained from Manchester Nanomaterials Ltd. U.K. Polytetrafluoroethylene was obtained from Omnipore® membrane filters (JVWP01300) with a pore size of 0.2 μm and polyvinylidene fluoride was obtained from Durapore® membrane filters (vvlp01300, 0.1 μm). Millipore water (18.2 MΩ) was obtained from a Milli-Q® water purification system. $WS_2$ was obtained from Alfa Aesar®.

Characterisation Techniques

Raman spectra were obtained using Renishaw inVia microscope with a 532 nm excitation laser operated at a low power of 0.274 mW with an 1800 l/mm grating and a 100× objective. The sample for Raman measurement was prepared by drop coating the dispersion of the TMDC product on to a $Si/SiO_2$ wafer which was then dried at room temperature. For AFM analysis the TMDC product dispersion was spray coated onto a $Si/SiO_2$ substrate which was dried in a vacuum oven at 40° C. X-ray photoelectron spectroscopy (XPS) was performed using a Kratos Axis Ultra DLD spectrometer with a monochromated Al Kα X-ray source (E=1486.6 eV, 10 mA emission), a hemispherical electron energy analyser and a multichannel plate and delay line detector (DLD). The samples for XPS were prepared by filtering the TMDC product dispersion on PVDF membrane. UV-visible spectroscopy measurements were taken using a model DH-2000-BAL (ocean optics).

Production of $2H-MoS_2$ Nanosheets and Graphene for Comparison and Testing $2H-MoS_2$ was prepared by solution phase exfoliation. 1.0 g of $MoS_2$ powder (Sigma, 99% with average particle size of 6 μm) dissolved in 100 mL of water/isopropanol mixture (1:1 v/v) was placed in a 250 mL round bottom flask. The mixture was then sonicated in a water bath sonicator (Elmasonic P70H) which operates at 37 kHz and 40% amplitude for 12 h while cooling to maintain a stable temperature of 20° C. The resulting suspension was centrifuged at 6000 rpm twice for 30 min to remove any unexfoliated material. A stable dispersion of the supernatant was obtained and characterisation of the resulting suspension revealed that the exfoliated $MoS_2$ was in the 2H-phase.

In a similar way, 2.0 g of graphite powder (sigma) was dissolved in 100 mL of water/isopropanol mixture (1:1 v/v)

and sonicated for 18 h at 37 kHz and 40% amplitude as previously method. The resulting suspension was centrifuged at 6000 rpm twice for 30 min, and the supernatant collected for analysis.

Conclusions

The invention therefore provides a simple and cost effective bench top experiment for the production of high concentration 1T-TMDCs. The method obviates the use of potentially explosive materials (such as metallic Li or organolithium compounds); by using lithium salts as the source of Li and an inert counter electrode, the experiment can be set up in ambient conditions without the need for a glove box.

The method has been comprehensively exemplified for the production of $MoS_2$. Production of $1T-WS_2$ has also been performed, demonstrating the applicability of the method to other 1T-TDMC products.

Characterisation of the exfoliated products was performed using X-ray photoelectron spectroscopy, Raman spectroscopy and UV-visible absorption spectroscopy. This confirmed the formation of the 1T-phase with a concentration of 60% for $MoS_2$. Significantly, the flake thickness examination using atomic force microscopy (AFM) and Raman data analysis indicated that the majority of the $MoS_2$ flakes were trilayer nanosheets. For $WS_2$, formation of few (about 5 layers) $WS_2$ with a 1T-phase with a concentration of 52% was observed.

The utility of the $1T-MoS_2$ has been demonstrated as an efficient electrocatalyst for the hydrogen evolution reaction (HER) and as an electrode material for high performing coin cell supercapacitors.

An Electrode Material for a Supercapacitor

The capacitance of the produced $1T-MoS_2$ was tested in symmetrical coin cells using cyclic voltammetry and chronopotentiometry. Comparison $2H-MoS_2$ electrodes were also made.

$MoS_2$ electrodes were prepared by filtering a known volume of the dispersions onto a pre-weighed PVDF filter using a syringe pump dispenser (New Era Pump Systems, Inc, NY). The $MoS_2$ membranes were then dried at room temperature in air. Coin cell assembly was prepared in standard CR2032 coin cell hardware with symmetrical active materials. The cells were assembled by stacking two symmetrical membranes back-to-back with the active material contacting the current collector. A few drops of the desired electrolyte (deoxygenated 6.0 M KOH (aq) or 1.0 M tetraethylammonium tetrafluoroborate ([Tea][$BF_4$]) in acetonitrile or propylene carbonate) was added to fill the electrode before the coin cell was sealed using a hydraulic crimping machine (MSK-160D). Coin cell assembly was carried out in an Ar-filled globe box for the case of organic electrolytes. Gravimetric capacitance, volumetric capacitance, energy and power density were calculated using the best practice methods established in literature.

Figure 4:
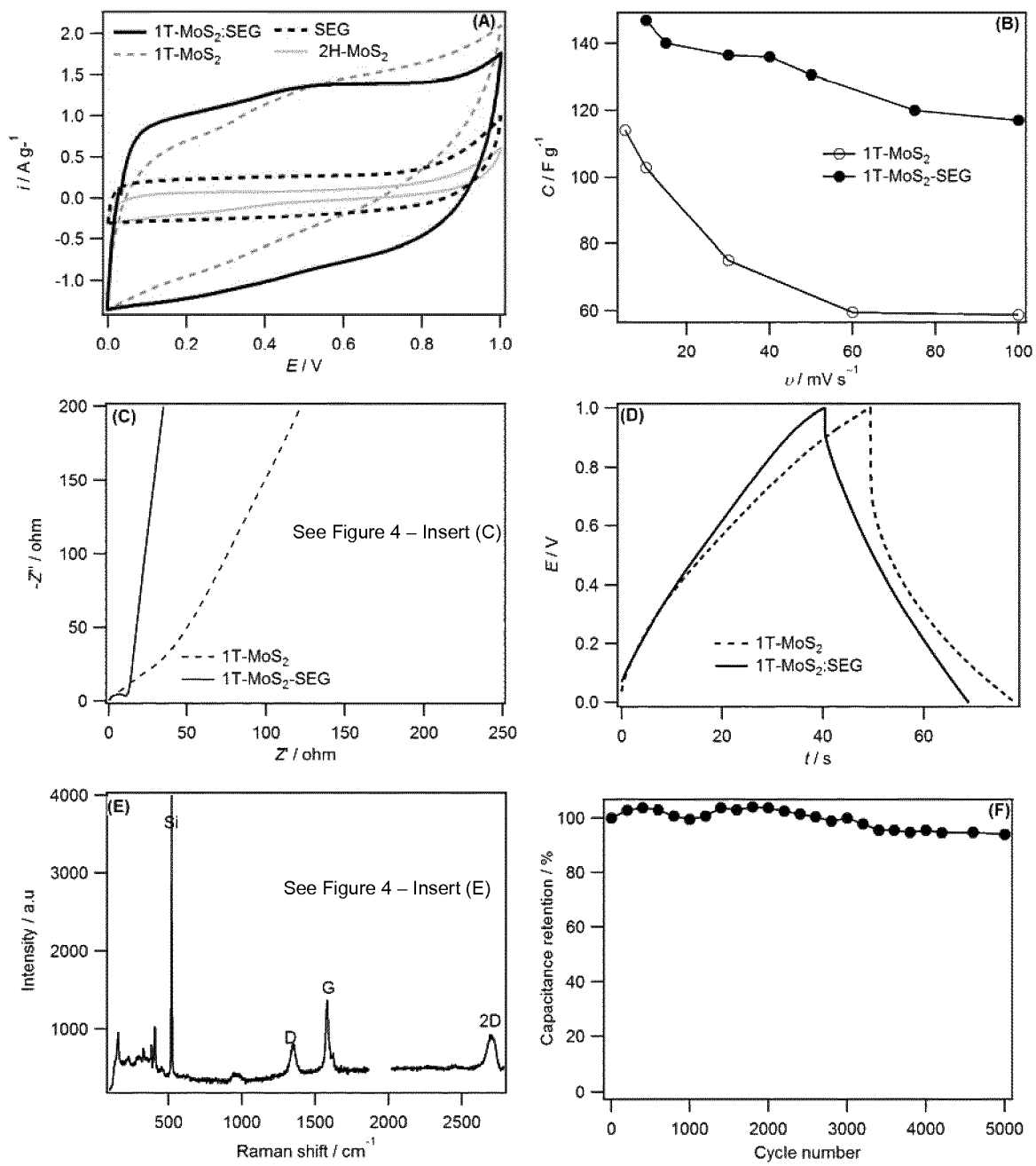
FIG. 4 shows (A) Cyclic voltammograms recorded at 20 mV s$^{-1}$ in 6.0 M KOH (aq) using symmetrical coin cells constructed from indicated electrodes. The voltage was scanned between 0.0 V (initial potential) and 1.0 V, (B) Gravimetric capacitance as a function of scan rates at indicated electrodes, (C) Nyquist plots obtained using the coin cells at shown electrodes and the inset shows the Bode plot. The measurements were carried out at an amplitude of 5 mV in the frequency range of 100 mHz to 100 KHz at open circuit potential. (D) Charge-discharge curve obtained from indicated electrodes at 1.0 A g$^{-1}$, (E) Raman spectrum of composite membrane showing both the 1T-MoS$_2$ peaks (enlarged in inset, J$_1$, J$_2$, J$_3$, J$_{2g}$ and A$_{1g}$) and graphene peaks (D, G and 2D bands), (F) Capacitance retention of 1T-MoS$_2$/SEG (solution exfoliated graphene) electrodes after 5,000 cycles in 6.0 M KOH (aq).

The CVs obtained using electrodes made from the 2H phase displayed a gravimetric capacitance of 6 F $g^{-1}$ whereas the 1T phase displayed a gravimetric capacitance of 102 F $g^{-1}$ at 10 mV $s^{-1}$ (FIG. 4a). These are consistent with previous reports.

The capacitance of 1T phase was found to be strongly dependent on the potential scan rate: at 5 mV $s^{-1}$ the gravimetric capacitance was 114 F $g^{-1}$ and this value decreased almost by half at 100 mV $s^{-1}$ to 59 F $g^{-1}$ (FIG. 4b). Similarly, the capacitance obtained from the charge-discharge curve also showed an analogous trend to the CV data where the capacitance decreased from 118 F $g^{-1}$ at 0.5 A $g^{-1}$ to 50 F $g^{-1}$ at 5 A $g^{-1}$. The decrease in capacitance upon increasing scan rate (v) or discharge current might be associated with the effect of ion diffusion as well as with the resistivity of the electrode. In particular, when the charge storage mechanism involves faradic reaction, the effect of ion diffusion into the layered $MoS_2$ structure becomes more pronounced. For example, the experimental time scale could be too short to intercalate ions into the layered structures at high v which then account for the low capacitance.

The internal resistance of the device also contributes to the decrease in capacitance. The effect of resistance is more apparent when examining the charge-discharge curve. The obtained discharge curve showed a significant voltage drop (>0.3 V) for the cell that was constructed using $1T-MoS_2$ (FIG. 4d). Therefore, increasing the conductivity of the electrode, by adding highly conductive graphene, is expected to enhance the capacitance at higher discharge currents. The inventors fabricated a nanocomposite that consists of $1T-MoS_2$ and solution exfoliated graphene (SEG) to alleviate these problems. The composite was made by mixing $1T-MoS_2$ with SEG in a one to one concentration ratio. Representative Raman spectra showed the characteristic $1T-MoS_2$ peaks and graphene peaks, demonstrating that the two materials are uniformly mixed and distributed across the membrane (FIG. 4e). Moreover, the presence of graphene with the $1T-MoS_2$ in the composite did not induce a phase transition.

The electrodes made from the composite materials displayed the typical capacitive behaviour with nearly rectangular shape. The charge-discharge curve also displayed a symmetrical linear shape (FIGS. 4a and 4d). Significantly, $1T-MoS_2$/graphene electrode showed an enhanced gravimetric capacitance with little loss as the discharge current increased. For example, the composite material displayed a capacitance of 147 F $g^{-1}$ at 10 mV $s^{-1}$ and 120 F $g^{-1}$ at 100 mV $s^{-1}$ (FIG. 4b). The enhanced capacitance in the composite material is probably due to the synergistic effect between $1T-MoS_2$ and graphene where graphene enhances the overall conductivity of the composite while also reducing the re-aggregation of the sheets.

The synergistic effect was more evident when comparing the gravimetric capacitance of pure graphene (18 F $g^{-1}$) and $1T-MoS_2$ with that of the composite. EC impedance spectroscopy analysis was also carried out to further determine the electrochemical behaviour of each electrode. Nyquist and Bode plots were obtained at open circuit potential over the frequency range of 100 kHz to 10 m Hz (FIG. 4c). The Nyquist plot of the composite electrode displayed a nearly vertical curve with low serial resistance of 0.4 $\Omega cm^2$ while the cell made from $1T-MoS_2$ electrode showed a serial resistance 1 $\Omega cm^2$ and a transition from a linear looking feature to Warburg impedance at a frequency of 2.6 Hz. These observations, together with the fact that the Bode phase angle is close to 90° at the composite electrode, demonstrate that that the cell is behaving close to an "ideal capacitor".

High volumetric capacitance is attractive for portable electronics and vehicles so the volumetric capacitance of the cell constructed using this composite electrode was assessed. Volumetric capacitances of 560 F $cm^{-3}$ at 10 mV $s^{-1}$ and 458 F $cm^{-3}$ at 100 mV $s^{-1}$ were obtained. These values are higher than the volumetric capacitance achieved using the best performing carbon-based electrodes. Lin et al. reported 490 F $cm^{-3}$ in $Li_2SO_4$ (aq) with N-doped mesoporous few-layer carbon at 2 mV $s^{-1}$ and Yang et al. reported ~250 F $cm^{-3}$ using restacked graphene sheets. Acerece et al. reported ~450 F $cm^{-3}$ in KCl (aq) and 600 F $cm^{-3}$ in $H_2SO_4$ (aq) at 10 mV $s^{-1}$ using chemically exfoliated 1T-MoS$_2$. Ghidiu et al. reported 900 F cm$^{-3}$ in H$_2$SO$_4$ (aq) at 2 mV s$^{-1}$ using conducting and hydrophilic Ti$_3$C$_2$ electrodes. While the gravimetric capacitance of the composite material exemplified herein is in the same range as in graphene-based electrodes, the volumetric capacitance of our composite material is twice that of most carbon-based electrodes. Galvanostatic charge-discharge cycling of the composite material between 0.0 V to 0.8 V at 1 A g$^{-1}$ for 5,000 cycles exhibited excellent stability with a capacitance retention of over 92% (FIG. 4f). Moreover, the serial resistance of the device did not increase by any notable amount after cycling. The small loss in capacitance is an indication of no phase transition.

Figure 5:
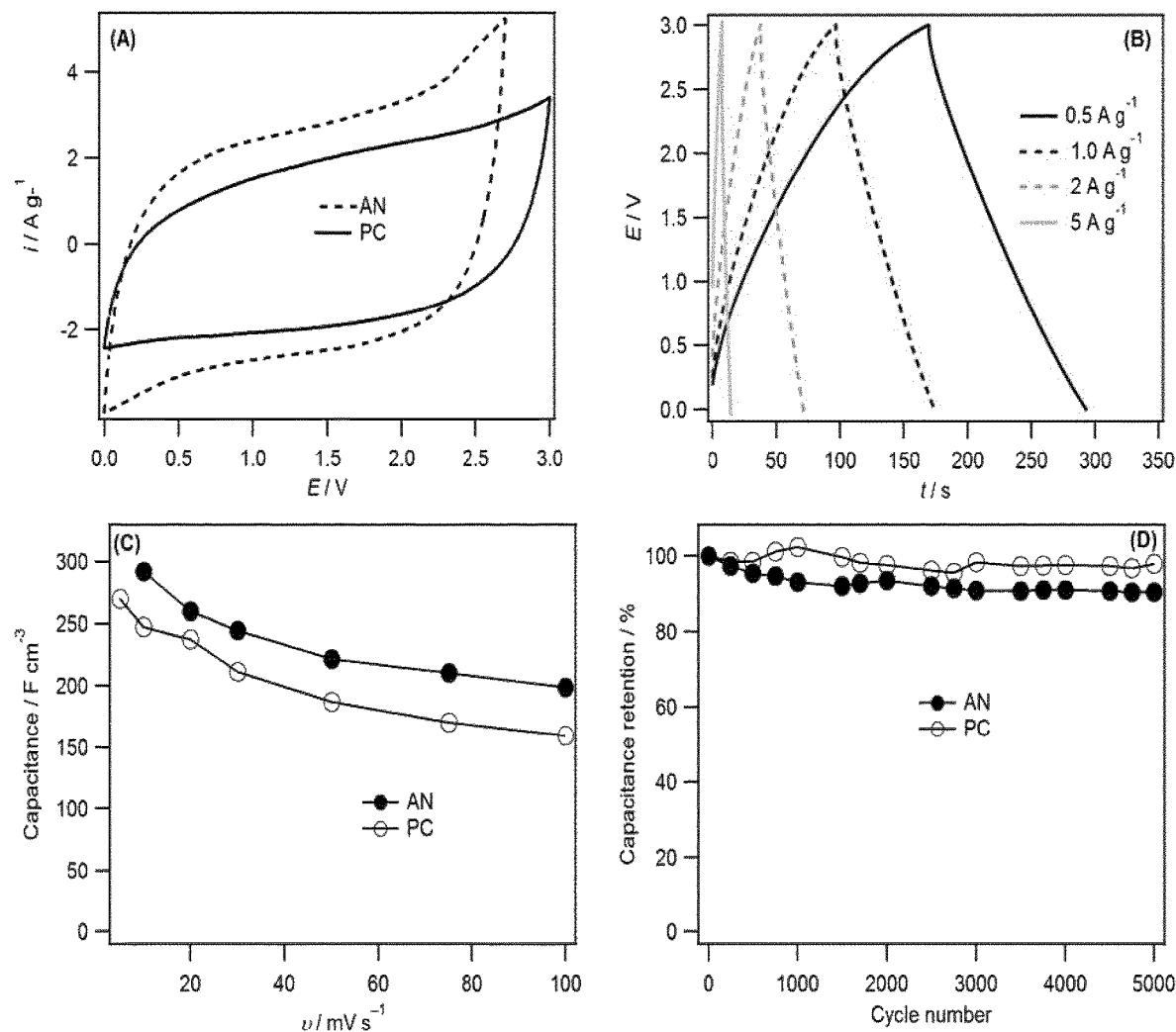
FIG. 5 shows (A) Cyclic voltammograms recorded at 100 mV s$^{-1}$ in 1.0 M [Tea][BF$_4$] in acetonitrile and 1.0 M [Tea][BF$_4$] in propylene carbonate using symmetrical coin cells constructed from 1T-MoS$_2$/SEG electrodes. The voltage was scanned between 0.0 V (initial potential) and 2.7 V for acetonitrile and 0.0 V to 3.0 V for propylene carbonate, (B) galvanostatic charge-discharge curves obtained using 1.0 M [Tea][BF$_4$] in propylene carbonate at indicated currents, (C) Volumetric capacitance as a function of scan rates and (D) Capacitance retention of 1T-MoS$_2$/SEG electrodes after 5,000 cycles.

Finally, the composite electrode was tested using non-aqueous electrolytes to take advantage of the wide electrochemical window. Acetonitrile (AN) and propylene carbonate (PC) with tetraethylammonium tetrafluoroborate electrolyte were tested. The AN-based electrolyte showed a potential window of ~2.7 V whilst the PC-based electrolyte showed an enhanced potential window of 3.0 V (FIG. 5a). Furthermore, examination of the CV and charge-discharge curve showed the composite electrode produced responses that are expected for capacitive behaviour. The volumetric capacitance of each electrolyte as a function of v was measured (FIG. 5c). Volumetric capacitances of 292 F cm$^{-3}$ for AN and 247 F cm$^{-3}$ for PC were obtained at 10 mV s$^{-1}$ which are in close agreement with the ones obtained from charge-discharge at 0.5 A g$^{-1}$; 287 F cm$^{-3}$ for AN and 206 F cm$^{-3}$ for PC. Furthermore, the composite electrode showed excellent stability in PC electrolytes with more than 96% capacity retention after 5000 cycles while in AN the capacity retention was ~90% (FIG. 5d).

Energy and power densities as well as gravimetric and volumetric capacitance obtained at various discharge currents in each electrolyte are shown in Table 1.

TABLE 1

Gravimetric capacitance (cg), volumetric capacitance, volumetric and gravimetric energy and power density obtained at different discharge current from 1.0M [Tea][BF4] in acetonitrile and 1.0M [Tea][BF4] in propylene carbonate.

| Electrolytes | Current (A g$^{-1}$) | C$_g$ (F g$^{-1}$) | C$_v$ (F cm$^{-3}$) | Ev$^a$ (Wh cm$^{-3}$) | Pv$^a$ (W cm$^{-3}$) | E$_g$$^a$ (Wh g$^{-1}$) | P$_g$$^a$ (W g$^{-1}$) |
|---|---|---|---|---|---|---|---|
| AN | 0.5 | 75 | 287 | 0.282 | 4 | 0.07 | 1. |
|  | 1 | 66 | 252 | 0.23 | 8 | 0.06 | 2 |
|  | 3 | 52 | 197 | 0.17 | 24 | 0.04 | 6 |
|  | 5 | 45 | 173 | 0.14 | 39 | 0.036 | 10 |
|  | 10 | 34 | 130 | 0.08 | 66 | 0.02 | 17.5 |
| PC | 0.5 | 48 | 211 | 0.25 | 7.4 | 0.057 | 1.7 |
|  | 1 | 46 | 174 | 0.2 | 9.5 | 0.05 | 2.5 |
|  | 3 | 38 | 146 | 0.15 | 24 | 0.04 | 6.3 |
|  | 5 | 32 | 123 | 0.1 | 53 | 0.026 | 14 |
|  | 10 | 28 | 105 | 0.056 | 85.5 | 0.015 | 22 |

$^a$ ((Note that voltage used for energy and power density calculation changes according to applied discharge current because of ohmic drop)).

In general, the AN performed better than the PC electrolyte because of its low viscosity. In the AN electrolyte, depending on the magnitude of discharge current, the energy densities varied between 0.08 Wh cm$^{-3}$ and 0.28 Wh cm$^{-3}$ with corresponding power densities between 1 W cm$^{-3}$ and 18 W cm$^{-3}$ while in the PC electrolyte they were between 0.06-0.25 Wh cm$^{-3}$ and 1.7-22 W cm$^{-3}$. These values are much higher than the energy/power density obtained using carbon-based electrodes and within close agreement of chemically exfoliated 1T-MoS$_2$ electrodes. This demonstrates that the 1T MoS$_2$/graphene composite shows potential as an attractive electrode for portable supercapacitor devices.

Hydrogen Evolution Reaction at 1T-MoS$_2$

The electrocatalytic activity of 1T-MoS$_2$ produced according to the method of the invention towards HER was assessed using liner sweep voltammetry and electrochemical impedance spectroscopy using a three electrode configuration in deoxygenated 0.5 M H$_2$SO$_4$ (aq). The electrodes were prepared by drop-coating a suspension of 1T-MoS$_2$ onto glassy carbon electrodes to a mass loading of 12 μg cm$^{-2}$.

Hydrogen evolution reaction measurements were performed using a three-electrode cell consisting of a 3-mm-diameter glassy carbon (GC) disk working electrode, an Ag|AgCl reference electrode, and a Pt counter electrode (area of 1.2 cm$^2$). Before use, GC working electrodes were polished with aqueous 0.3 μm alumina (Buehler, Lake Bluff, Ill.) slurries on felt polishing pads and rinsed with deionized water. GC electrodes were modified with 10 μL of the MoS$_2$ dispersion (either 1T-MoS$_2$ or 2H-MoS$_2$) and then dried at room temperature in air. Cyclic voltammograms (CVs) were recorded in 1 M H$_2$SO$_4$ at 5 mV s$^{-1}$ which was deoxygenated prior to use by bubbling with N$_2$ for 30 min. A blanket of N$_2$ was maintained above the electrolyte during measurements. Electrochemical impedance spectroscopy (EIS) was performed in the frequency range from 100 kHz to 100 mHz at an oscillation amplitude of 5 mV and an applied potential of –0.45 V vs. Ag|AgCl. Impedance spectra were fitted to a Randles equivalent circuit model using Z-view software (Scribner Associates, Inc., Southern Pines, N.C.).

Polarisation curves were compared at Pt, 2H-MoS$_2$ and 1T-MoS$_2$ electrocatalysts. In each case the current densities were normalized to the geometric area of each electrode and the data was corrected for iR (ohmic) drop. The 2H phase displayed an overpotential (η) of ~0.25 V and reasonable amount of current density (10 mA cm$^{-2}$) only flowed when η exceeded 0.35V. The low catalytic activity for HER is presumably due to the small surface area of the active edge sites as well as poor electrical transport between the active site and the basal plane. In particular, for 2D 2H-MoS$_2$ nanosheets, the portion of the inert basal plane is significantly larger than its edge site this then led to the low HER electrocatalytic current. However, the 1T phase exhibited low η of 0.13 V with substantial improvement in electrocatalytic current density (for example, 50 mA cm$^{-2}$ recorded at η=0.23 V). This observation correlates reasonably well with previously reported data.

The measured Tafel slopes for Pt, 1T and 2H phase MoS$_2$ were 33, 49, and 109 mV decade$^{-1}$ respectively, and these values are consistent with previous studies. The proposed general models for HER suggest that the Tafel plot should have a slope of 118 mV decade$^{-1}$ at 25° C. if the adsorption of hydrogen atoms (the Volmer step) is the rate-determining step. If the Heyrovsky or Tafel steps is rate determining, the Tafel slope should be about 40 mV decade$^{-1}$ and 30 mV decade$^{-1}$, respectively. Therefore, our data suggest that the rate of the HER at the 1T phase electrocatalyst is controlled by the Volmer-Heyrovsky step while at the 2H-phase the Volmer step is the rate determining. The electrocatalytic activity of 1T and 2H phase were also further examined by electrochemical impendence spectroscopy at η=0.25 V vs. RHE. The Nyquist plots were fitted to an equivalent circuit that contains solution resistance (R$_S$), constant phase element (CPE) and a charge transfer resistance (R$_{CT}$). The Nyquist plots show one semicircle due to R$_{CT}$ of HER. From the best fits of the data to the equivalent circuit, values for R$_{CT}$ at each electrocatalyst were obtained. For the 2H phase the $R_{CT}$ of HER was 320 $\Omega cm^2$, this value was decreased to 20 $\Omega cm^2$ at the 1T phase. The trend in the $R_{CT}$ values shows that charge transfer was significantly faster at the 1T-$MoS_2$ surface than at the 2H-$MoS_2$, which is consistent with the linear sweep voltammogram data.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

REFERENCES

The publications that follow are to more fully describe and disclose the invention and the state of the art to which the invention pertains. The entirety of each of these references is incorporated herein as though fully set forth.

1. M. A. Py and R. R. Haering, *Can. J. Phys.*, 1983, 61, 76-84.
2. RadisavljevicB, RadenovicA, BrivioJ, GiacomettiV and KisA, *Nat Nano*, 2011, 6, 147-150.
3. M. Acerce, D. Voiry and M. Chhowalla, *Nat. Nanotechnol.*, 2015, 10, 313-318.
4. M. A. Lukowski, A. S. Daniel, F. Meng, A. Forticaux, L. S. Li and S. Jin, *J. Am. Chem. Soc.*, 2013, 135, 10274-10277.
5. D. Voiry, M. Salehi, R. Silva, T. Fujita, M. W. Chen, T. Asefa, V. B. Shenoy, G. Eda and M. Chhowalla, *Nano Lett.*, 2013, 13, 6222-6227.
6. C. Tan, W. Zhao, A. Chaturvedi, Z. Fei, Z. Zeng, J. Chen, Y. Huang, P. Ercius, Z. Luo, X. Qi, B. Chen, Z. Lai, B. Li, X. Zhang, J. Yang, Y. Zong, C. Jin, H. Zheng, C. Kloc and H. Zhang, *Small*, 2016, 12, 1866-1874.
7. X. M. Geng, W. W. Sun, W. Wu, B. Chen, A. Al-Hilo, M. Benamara, H. L. Zhu, F. Watanabe, J. B. Cui and T. P. Chen, *Nat. Comm.*, 2016, 7.
8. Q. Tang and D.-e. Jiang, *ACS Catalysis*, 2016, 6, 4953-4961.
9. P. Joensen, R. F. Frindt and S. R. Morrison, *Mater. Res. Bull.*, 1986, 21, 457-461.
10. B. K. Miremadi and S. R. Morrison, *J. Catal.*, 1987, 103, 334-345.
11. G. Eda, H. Yamaguchi, D. Voiry, T. Fujita, M. W. Chen and M. Chhowalla, *Nano Lett.*, 2011, 11, 5111-5116.
12. M. B. Dines, *Mater. Res. Bull.*, 1975, 10, 287-291.
13. P. Joensen, E. D. Crozier, N. Alberding and R. F. Frindt, *J. Phys. C Solid State*, 1987, 20, 4043-4053.
14. D. Voiry, A. Mohite and M. Chhowalla, *Chem. Soc. Rev.*, 2015, 44, 2702-2712.
15. C. A. Papageorgopoulos and W. Jaegermann, *Surf. Sci.*, 1995, 338, 83-93.
16. Q. Liu, X. Li, Q. He, A. Khalil, D. Liu, T. Xiang, X. Wu and L. Song, *Small*, 2015, n/a-n/a.
17a. Z. Zeng, Z. Yin, X. Huang, H. Li, Q. He, G. Lu, F. Boey, and H. Zhang, *Angew. Chem.-Int. Edit.*, 2011, 50, 11093-11097.
17b. Z. Y. Zeng, T. Sun, J. X. Zhu, X. Huang, Z. Y. Yin, G. Lu, Z. X. Fan, Q. Y. Yan, H. H. Hng and H. Zhang, *Angew. Chem.-Int. Edit.*, 2012, 51, 9052-9056.
17c. J. Zheng, H. Zhang, S. H. Dong, Y. P. Liu, C. T. Nai, H. S. Shin, H. Y. Jeong, B. Liu and K. P. Loh, *Nat. Commun.*, 2014, 5.
18. A. Gigot, M. Fontana, M. Serrapede, M. Castellino, S. Bianco, M. Armandi, B. Bonelli, C. F. Pirri, E. Tresso, P. Rivolo, *Appl. Mater. Interfaces*, 2016, 8, 32842-32852.
19. C. Lee, H. Yan, L. E. Brus, T. F. Heinz, J. Hone and S. Ryu, *ACS Nano*, 2010, 4, 2695-2700.
20. H. Li, Q. Zhang, C. C. R. Yap, B. K. Tay, T. H. T. Edwin, A. Olivier and D. Baillargeat, *Adv. Funct Mater.*, 2012, 22, 1385-1390.
21. S. J. Sandoval, D. Yang, R. F. Frindt and J. C. Irwin, *Phys. Rev. 8*, 1991, 44, 3955-3962.
22. D. Yang, S. J. Sandoval, W. M. R. Divigalpitiya, J. C. Irwin and R. F. Frindt, *Phys. Rev. 8*, 1991, 43, 12053-12056.
23. M. Calandra, *Phys. Rev. 8*, 2013, 88, 6.
24. M. Velicky, M. A. Bissett, C. R. Woods, P. S. Toth, T. Georgiou, I. A. Kinloch, K. S. Novoselov and R. A. W. Dryfe, *Nano Lett.*, 2016, 16, 2023-2032.
25. X. B. Fan, P. T. Xu, Y. C. Li, D. K. Zhou, Y. F. Sun, M. A. T. Nguyen, M. Terrones and T. E. Mallouk, *J. Am. Chem. Soc.*, 2016, 138, 5143-5149.
26. C. Backes, R. J. Smith, N. McEvoy, N. C. Berner, D. McCloskey, H. C. Nerl, A. O'Neill, P. J. King, T. Higgins, D. Hanlon, N. Scheuschner, J. Maultzsch, L. Houben, G. S. Duesberg, J. F. Donegan, V. Nicolosi and J. N. Coleman, *Nat. Commun.*, 2014, 5.
27. J. P. Wilcoxon, P. P. Newcomer and G. A. Samara, *J. Appl. Phys.*, 1997, 81, 7934-7944.
28. Y. T. Liu, X. D. Zhu, Z. Q. Duan and X. M. Xie, *Chem. Commun.* (Cambridge, U. K.), 2013, 49, 10305-10307.
29. R. Kappera, D. Voiry, S. E. Yalcin, B. Branch, G. Gupta, A. D. Mohite and M. Chhowalla, *Nat. Mater.*, 2014, 13, 1128-1134.

30. U. Halim, C. R. Zheng, Y. Chen, Z. Y. Lin, S. Jiang, R. Cheng, Y. Huang and X. F. Duan, *Nat. Commun.,* 2013, 4, 7.
31. M. A. Bissett, I. A. Kinloch and R. A. W. Dryfe, *ACS Appl. Mater. Interfaces,* 2015, 7, 17388-17398.
32. M. D. Stoller and R. S. Ruoff, *Energy Environ. Sci.,* 2010, 3, 1294-1301.
33. T. Q. Lin, I. W. Chen, F. X. Liu, C. Y. Yang, H. Bi, F. F. Xu and F. Q. Huang, *Science,* 2015, 350, 1508-1513.
34. X. W. Yang, C. Cheng, Y. F. Wang, L. Qiu and D. Li, *Science,* 2013, 341, 534-537.
35. M. Ghidiu, M. R. Lukatskaya, M.-Q. Zhao, Y. Gogotsi and M. W. Barsoum, *Nature,* 2014, 516, 78-81.
36. B. Xu, S. F. Yue, Z. Y. Sui, X. T. Zhang, S. S. Hou, G. P. Cao and Y. S. Yang, *Energy Environ. Sci.,* 2011, 4, 2826-2830.
37. M. D. Stoller, S. J. Park, Y. W. Zhu, J. H. An and R. S. Ruoff, *Nano Lett.,* 2008, 8, 3498-3502.
38. E. Raymundo-Pinero, M. Cadek and F. Beguin, *Adv. Funct. Mater.,* 2009, 19, 1032-1039.
39. S. Murali, N. Quarles, L. L. Zhang, J. R. Potts, Z. Q. Tan, Y. L. Lu, Y. W. Zhu and R. S. Ruoff, *Nano Energy,* 2013, 2, 764-768.
40. Z. Chen, J. Wen, C. Z. Yan, L. Rice, H. Sohn, M. Q. Shen, M. Cai, B. Dunn and Y. F. Lu, *Adv. Energy Mater.,* 2011, 1, 551-556.
41. Y. Tao, X. Y. Xie, W. Lv, D. M. Tang, D. B. Kong, Z. H. Huang, H. Nishihara, T. Ishii, B. H. Li, D. Golberg, F. Y. Kang, T. Kyotani and Q. H. Yang, *Sci. Rep.,* 2013, 3.
42. E. Navarro-Flores, Z. W. Chong and S. Omanovic, *J. Mol. Catal. A: Chem.,* 2005, 226, 179-197.
43. B. Børresen, G. Hagen and R. Tunold, *Electrochim. Acta,* 2002, 47, 1819-1827.

The invention claimed is:

1. An electrochemical capacitor comprising a composite electrode, the composite electrode comprising 1T-$MoS_2$ nanosheets and graphene, wherein the 1T-$MoS_2$ nanosheets is at least 50% by weight trilayer nanosheets and wherein the composite electrode comprises graphene and the $MoS_2$ nanosheets of the composite electrode are at least 50% 1T phase.

2. The electrochemical capacitor of claim 1, wherein the composite electrode comprises graphene and $MoS_2$ nanosheets in a 1:1 weight ratio.

3. The electrochemical capacitor of claim 1, wherein the composite electrode comprises graphene and $MoS_2$ nanosheets in a 1:1 weight ratio.

4. A method of producing an electrochemical capacitor of claim 1, comprising:

producing 1T-transition metal dichalcogenide few-layer nanosheets and/or monolayer nanosheets, the method comprising:
(i) an electrochemical intercalation step in an electrochemical cell, the cell comprising a negative electrode comprising a bulk 2H-transition metal dichalcogenide, a counter electrode which is not lithium, and an electrolyte comprising a lithium salt in a solvent, wherein said solvent is capable of forming a solid electrolyte interface layer;
wherein the electrochemical intercalation step applying a potential difference to the cell so as to intercalate lithium ions into the negative electrode to provide an intercalated electrode; then
(ii) an exfoliation step comprising contacting the intercalated electrode with a protic solvent to produce 1T-transition metal dichalcogenide few-layer nanosheets and/or monolayer nanosheets,
wherein the transition metal dichalcogenide is $MoS_2$ which produces 1T-$MoS_2$ nanosheets and the 1T-$MoS_2$ nanosheets is at least 50% by weight trilayer nanosheets and wherein the $MoS_2$ nanosheets of the composite electrode are at least 50% 1T phase;
combining the 1T-$MoS_2$ nanosheets with graphene to produce the composite electrode comprising graphene for use in the electrochemical capacitor; and
producing the electrochemical capacitor comprising the composite electrode comprising graphene.

5. The method of claim 4, wherein the counter electrode comprises a precious metal.

6. The method of claim 4, wherein the counter electrode is platinum.

7. The method of claim 4, wherein the electrolyte comprises a solvent which is selected from dimethyl carbonate, ethylene carbonate, propylene carbonate, and mixtures thereof.

8. The method of claim 4, wherein the electrolyte is a lithium salt in a mixture of dimethyl carbonate and ethylene carbonate.

9. The method of claim 4, wherein the lithium salt is $LiClO_4$.

10. The method of claim 4, wherein the potential difference is applied to the electrochemical cell for between 1 and 6 hours.

11. The method of claim 4, wherein negative electrode is a pellet of compressed 2H-$MoS_2$ powder.

12. The method of claim 4, wherein the negative electrode comprises a 2H-$MoS_2$ crystal.

* * * * *